(12) United States Patent
Moriya

(10) Patent No.: US 7,520,618 B2
(45) Date of Patent: Apr. 21, 2009

(54) IMAGE STABILIZER

(75) Inventor: Chikatsu Moriya, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 417 days.

(21) Appl. No.: 11/338,749

(22) Filed: Jan. 25, 2006

(65) Prior Publication Data
US 2006/0176366 A1 Aug. 10, 2006

(30) Foreign Application Priority Data
Feb. 4, 2005 (JP) ............... 2005-029582

(51) Int. Cl.
G03B 21/26 (2006.01)
G03B 21/00 (2006.01)
H04N 7/18 (2006.01)

(52) U.S. Cl. .............. 353/37; 353/31; 348/64

(58) Field of Classification Search .......... 348/64, 348/208.3, 208.4, E5.46; 359/196; 353/37, 353/98, 99, 122, 31; 396/55
See application file for complete search history.

(56) References Cited
U.S. PATENT DOCUMENTS
5,842,054 A * 11/1998 Suzuki et al. ............. 396/55
7,292,270 B2 * 11/2007 Higurashi et al. ......... 348/208.3
2002/0154223 A1 * 10/2002 Moriya .................. 348/208.11

FOREIGN PATENT DOCUMENTS
EP 1 102 107 A2 10/2001
JP 2001-142103 A 5/2001
JP 2002-229089 A 8/2002
JP 2003-107554 A 4/2003

OTHER PUBLICATIONS
Machine translation of JP 2002-229089.*

* cited by examiner

Primary Examiner—Hung Henry Nguyen
(74) Attorney, Agent, or Firm—Birch, Stewart, Kolasch & Birch, LLP

(57) ABSTRACT

The present invention provides an image deflection correction apparatus which can switch a mode of image deflection correction (stop the image deflection correction) if it is judged that a camera (optical system) is in a pan/tilt operation, in which the determination condition for pan judgment as to whether or not the panning operation is active or the determination condition for tilt judgment as to whether or not the tilting operation is active, which is not satisfied ahead, is loosened, so that the operation is appropriately reflected to the starting motion of image on a photographing screen when the pan/tilt operation is performed in an oblique direction.

3 Claims, 5 Drawing Sheets

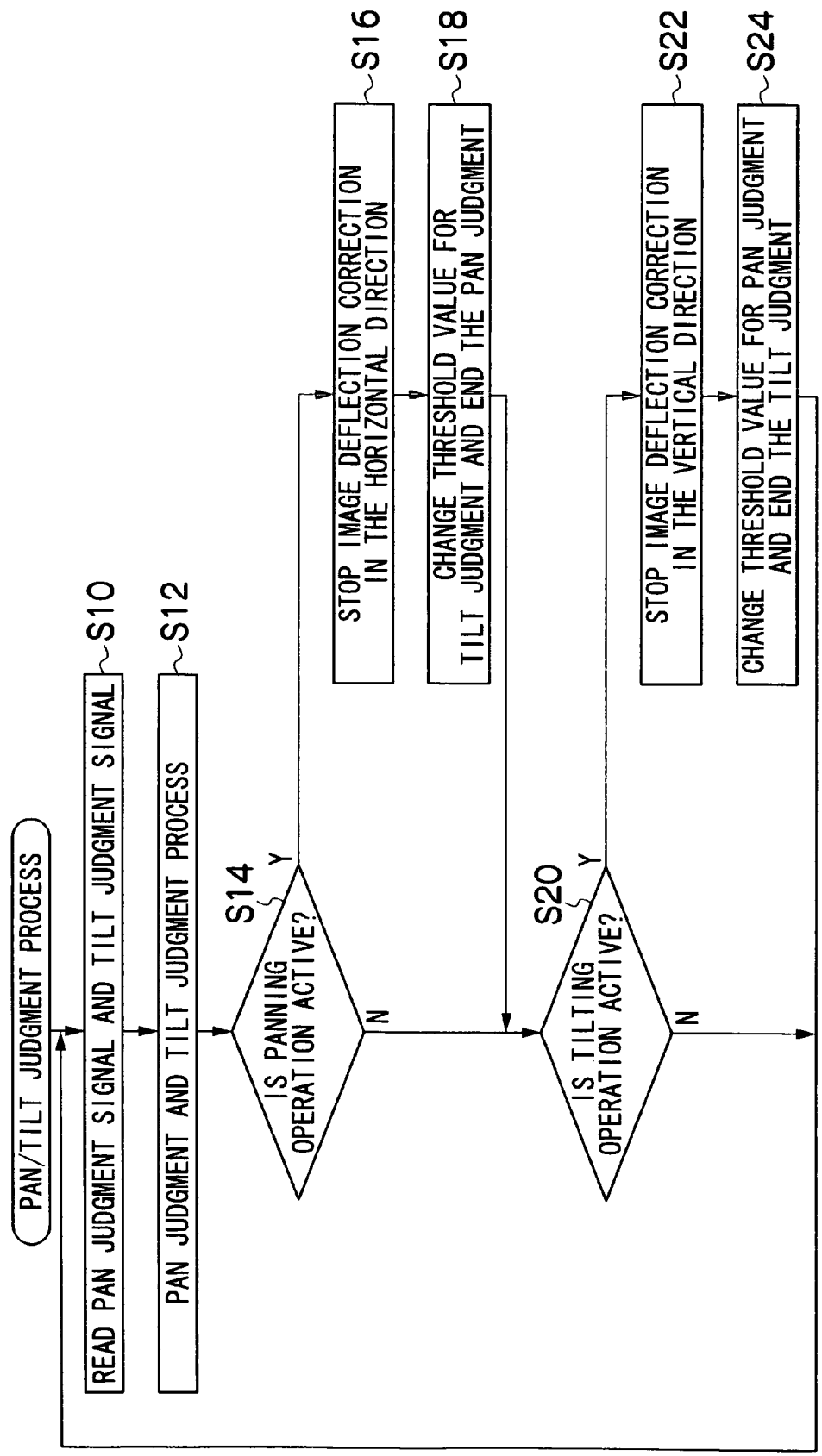

IMAGE STABILIZER

BACKGROUND OF THE INVENTION

1. Field of the Invention

The present invention relates to an image deflection correction apparatus, and more particularly to an image deflection correction apparatus which corrects (prevents) an image deflection caused by the vibration in a camera.

2. Description of the Related Art

An image deflection correction apparatus of a television camera to correct an image deflection is well known in which a vibration proofing lens is arranged freely movably within a plane orthogonal to an optical axis in a photographing optical system, and if the vibration is applied to the camera (photographing optical system of the camera), the vibration proofing lens is driven by an actuator to cancel the image deflection (e.g., refer to Japanese Patent Application Laid-Open No. 2001-142103 and Japanese Patent Application Laid-Open No. 2003-107554). Also, other methods for correcting the image deflection are well known besides the method of employing the vibration proofing lens movable within the plane orthogonal to the optical axis. A correction amount of canceling the image deflection against the vibration applied to the camera (equivalent to a displacement amount of the vibration proofing lens if the vibration proofing lens is employed) is calculated, based on a deflection signal outputted from a deflection detection sensor such as an angular velocity sensor, by detecting the vibration applied to the camera with the deflection detection sensor.

Also, the deflection signal outputted as the vibration by the deflection detection sensor is generated by the vibration subjected to the image deflection correction and the vibration caused by an intentional operation of changing the photographing composition by the cameraman. The operation of changing the photographing composition may be the panning operation for changing the composition in the horizontal direction, the tilting operation for changing the composition in the vertical direction, or the operation for changing the composition in the oblique direction between horizontal and vertical directions. In this specification, the operation of changing the composition is generally referred to as the pan/tilt operation. This pan/tilt operation is not involved in the vibration subjected to the image deflection correction, and it is not preferable to make the image deflection correction for the deflection signal caused by the pan/tilt operation.

Conventionally, a system has been offered for automatically judging whether or not the camera (optical system) is in the pan/tilt operation, based on a deflection signal obtained from the deflection detection sensor, in which the camera switches to a proper mode of image deflection correction where the pan/tilt operation is active, if it is judged that the camera is in the pan/tilt operation. For example, it has been proposed that if it is judged that the camera is in the pan/tilt operation, the image deflection correction is stopped (the efficacy of the image deflection correction is reduced) to resolve an unnatural screen caused by the image deflection correction in the pan/tilt operation or the bad operability due to the pan/tilt operation (e.g., refer to Japanese Patent Application Laid-Open No. 2002-229089). A judgment (pan/tilt judgment) whether or not the camera is in the pan/tilt operation is made depending on whether or not the magnitude of the deflection signal from the deflection detection sensor exceeds a prescribed threshold continually for a certain period of time or more, for example.

SUMMARY OF THE INVENTION

By the way, the deflection detection sensor is separately provided with the deflection detection sensor for detecting the vibration in the horizontal direction and the deflection detection sensor for detecting the vibration in the vertical direction. The judgment as to whether or not the camera is in the pan/tilt operation is made separately according to the pan judgment as to whether or not the camera is in the panning operation, based on the deflection signal outputted from the horizontal deflection detection sensor, or the tilt judgment as to whether or not the camera is in the tilting operation, based on the deflection signal outputted from the vertical deflection detection sensor. And if it is judged that the camera is in the panning operation by the panning judgment, the image deflection correction in the horizontal direction is stopped, or if it is judged that the camera is in the tilting operation by the tilting judgment, the image deflection correction in the vertical direction is stopped.

However, if the camera makes the pan/tilt operation in the oblique direction between the horizontal and vertical directions and both the panning operation and the tilting operation are performed at the same time, there is a great deviation between the timing when the panning operation is judged active and the timing when the tilting operation is judged active in some cases, because the pan judgment and the tilt judgment are separately made. In this case, since there is a great deviation between the timing when the image deflection correction in the horizontal direction is stopped and the timing when the image deflection correction in the vertical direction is stopped, a phenomenon arises that the image starts to move in a direction where the image deflection correction is stopped ahead on a photographing screen, and the image starts to move in the same oblique direction as the camera, only after the image deflection correction in the other direction is stopped. Therefore, when the cameraman makes the pan/tilt operation in the oblique direction, the motion of the image does not occur in the oblique direction as intended by the cameraman, resulting in a problem with a sense of incompatibility in the camera operation or the motion of the image. If the image deflection correction in the other direction is stopped unconditionally at the same time when the image deflection correction in one direction is stopped, this problem can be resolved, but it is not appropriate that the image deflection correction in both the horizontal and vertical directions is stopped while the camera is in the pan/tilt operation only in the horizontal or vertical direction, because the image deflection correction is not made in the direction where the pan/tilt operation is not active.

This invention has been achieved in the light of the above-mentioned problem, and it is an object of the invention to provide an image deflection correction apparatus that can switch the mode of image deflection correction between the horizontal direction and the vertical direction (stop the image deflection correction) so that a change of photographing composition by the pan/tilt operation in the oblique direction may be appropriately reflected to the starting motion of the image on the photographing screen without a sense of incompatibility when the optical system of the camera starts the pan/tilt operation in the oblique direction.

In order to accomplish the above object, according to a first aspect of the present invention, there is provided an image deflection correction apparatus comprising a horizontal deflection detection device which detects the vibration in the horizontal direction applied to an optical system and outputs a horizontal deflection signal according to the detected vibration, a vertical deflection detection device which detects the vibration in the vertical direction applied to the optical system and outputs a vertical deflection signal according to the detected vibration, a pan judgment device which judges whether or not a pan determination condition is satisfied to judge that the optical system is in a panning operation, based on the deflection signal outputted by the horizontal deflection detection device, a tilt judgment device which judges whether or not a tilt determination condition is satisfied to judge that the optical system is in a tilting operation, based on the deflection signal outputted by the vertical deflection detection device, a determination condition change device which changes the other determination condition to be more easily satisfied, if any one of the pan determination condition in the pan judgment device and the tilt determination condition in the tilt judgment device is satisfied, an image deflection correction device which corrects an image deflection to cancel the image deflection caused by the vibration in the horizontal and vertical directions applied to the optical system, based on the deflection signals outputted by the horizontal deflection detection device and the vertical deflection detection device, and a correction switch device which switches the mode of horizontal image deflection correction by the image deflection correction device to the mode where the panning operation is active, if it is judged that the pan determination condition is satisfied by the pan judgment device, or switches the mode of vertical image deflection correction by the image deflection correction device to the mode where the tilting operation is active, if it is judged that the tilt determination condition is satisfied by the tilt judgment device.

With the first aspect of the invention, if any one of the pan determination condition and the tilt determination condition is satisfied and the mode of image deflection correction in one direction is changed (stopped), the other determination condition is changed to be more easily satisfied (the other determination condition is loosened), whereby when the pan/tilt operation is performed in the oblique direction, there is less deviation between the timing when the pan determination condition is satisfied and the timing when the pan determination condition is satisfied. Therefore, there is less deviation between the timing when the mode of image deflection correction is changed in the horizontal direction and the timing when it is changed in the vertical direction, so that a change of photographing composition by the pan/tilt operation in the oblique direction is appropriately reflected to the starting motion of the image on the photographing screen without a sense of incompatibility. When the pan/tilt operation in other than the oblique direction, namely, the panning operation or tilting operation is performed to change the photographing composition, the determination condition may not be satisfied for the vibration occurring in different directions from the direction of changing the composition, even if the pan determination condition or the tilt determination condition is loosened, whereby there is no nonconformity for the pan/tilt operation in other than the oblique direction.

According to a second aspect of the invention, there is provided the image deflection correction apparatus, wherein the pan determination condition in the pan judgment device and the tilt determination condition in the tilt judgment device are that at least the magnitude of the deflection signal or the magnitude of the correction amount required to cancel the image deflection obtained based on the deflection signal exceeds a prescribed threshold value, and the determination condition change device changes the threshold value to the lower value than where the pan determination condition and the tilt determination condition are not satisfied, if any one of the pan determination condition and the tilt determination condition is satisfied. The second aspect of the invention provides one form of the determination condition change device under the pan determination condition and the tilt determination condition where at least the magnitude of the deflection signal exceeds the threshold value.

According to a third aspect of the invention, there is provided the image deflection correction apparatus, wherein the pan determination condition in the pan judgment device and the tilt determination condition in the tilt judgment device are that the magnitude of the deflection signal or the magnitude of the correction amount required to cancel the image deflection obtained based on the deflection signal exceeds a prescribed threshold value continually for a certain determination time or more, and the determination condition change device changes the determination time to the shorter time than where the pan determination condition and the tilt determination condition are not satisfied, if any one of the pan determination condition and the tilt determination condition is satisfied.

The third aspect of the invention provides another form of the determination condition change device under the pan determination condition and the tilt determination condition where at least the magnitude of the deflection signal exceeds the threshold value continually for the certain determination time or more.

With the image deflection correction apparatus of the invention, when the optical system of the camera starts the pan/tilt operation in the oblique direction, it is possible to switch the mode of image deflection correction between the horizontal direction and the vertical direction (stop the image deflection correction) so that a change of photographing composition by the pan/tilt operation in the oblique direction may be appropriately reflected to the starting motion of the image on the photographing screen without a sense of incompatibility.

BRIEF DESCRIPTION OF THE DRAWINGS

FIG. 5 is a flowchart showing a processing procedure of the pan/tilt judgment in the CPU 20.

DETAILED DESCRIPTION OF THE PREFERRED EMBODIMENTS

The preferred embodiments of an image deflection correction apparatus according to the present invention will be described below in detail with reference to the accompanying drawings.

Figure 1:
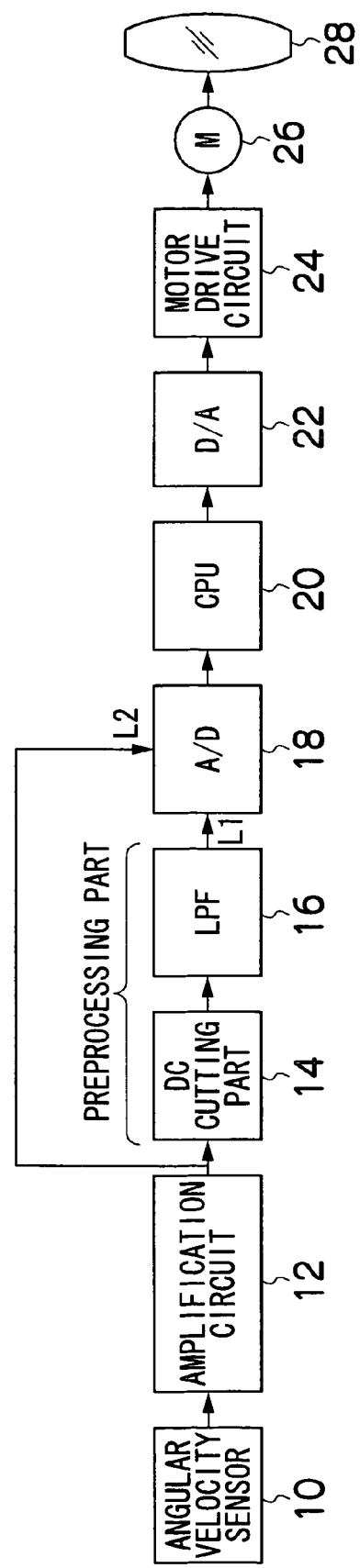
FIG. 1 is a block diagram showing the configuration of an image deflection correction apparatus according to the present invention.

FIG. 1 is a block diagram showing the configuration of an image deflection correction apparatus according to the invention. The image deflection correction apparatus is mounted on a lens unit (photographing lens) for a television camera, a movie camera, or a still camera. A vibration proofing lens 28 is arranged in an optical system for the lens unit or camera, on which this image deflection correction apparatus is mounted, to be movable to the left or right (horizontal direction) or up or down (vertical (perpendicular) direction) within a plane orthogonal to an optical axis of the optical system, as shown in FIG. 1. Also, the vibration proofing lens 28 is driven in the horizontal or vertical direction by a motor 26. When the vibration occurs in the camera (optical system), the vibration proofing lens 28 is moved to a position of correcting the image deflection (position of canceling the image deflection caused by the vibration) by the motor 26. Since the vibration proofing lens 28 is likewise driven against the vibration occurring in any of the horizontal and vertical directions, the configuration of making the image deflection correction in one direction (e.g., horizontal direction) is only shown in FIG. 1, and may be similarly made in the other direction.

In FIG. 1, an angular velocity sensor 10 is a gyro sensor installed as a deflection detection sensor for detecting the vibration of the optical system, and installed on an upper face of a lens barrel. From the angular velocity sensor 10, an electrical signal of voltage according to an angular velocity of vibration occurring in the horizontal direction of the optical system is outputted as an angular velocity signal.

The angular velocity signal outputted from the angular velocity sensor 10 is amplified by an amplification circuit 12, and has mainly the DC components (low frequency components of a predetermined cut-off frequency or less) cut off by a DC cutting part (high-pass filter (HPF)) 14, other frequency components passing through the DC cutting part 14. The angular velocity signal passing through the DC cutting part 14 is then inputted into a low-pass filter (LPF) 16. The LPF 16 cuts off the high frequency components not subjected to image deflection correction among the frequency components of the input angular velocity signal, and passes other frequency components through it. The angular velocity signal passing through the LPF 16 is converted into digital signal by an A/D converter 18, and inputted into a CPU 20. The angular velocity signal acquired by the CPU 20 through a preprocessing part consisting of the DC cutting part 14 and the LPF 16 is denoted as the angular velocity signal L1.

The CPU 20 makes an integration process for the angular velocity signal L1 inputted in the above way by making the arithmetical operation through a digital filter, and converts the angular velocity signal L1 into an angle signal. That is, the displacement amount of the vibration proofing lens 28 from the reference position to displace the image in a direction and a magnitude of canceling the image deflection caused by the vibration of the optical system (correction amount of canceling and correcting the image deflection) is obtained by making the integration process for the angular velocity signal L1. And the value of the correction amount (angle signal) acquired successively in the above way is outputted as the value indicating the movement target position of the vibration proofing lens 28.

The angle signal (correction amount) outputted from the CPU 20 is converted into analog signal by a D/A converter 22, and inputted into a motor drive circuit 24. The motor drive circuit 24 drives the motor 26 to move the vibration proofing lens 28 in the horizontal direction to a position corresponding to the value of the angle signal outputted from the CPU 20. Thereby, the image deflection caused by the vibration applied to the optical system is corrected.

The image deflection correction method may be other than the method as shown in this embodiment. The method of this embodiment employs an image displacement device which intentionally displaces an image formation position of an image formed by the optical system in the horizontal or vertical direction within an image formation plane by displacing the vibration proofing lens 28, and corrects the image deflection by displacing the image to cancel the image deflection caused by the vibration applied to the optical system with the image displacement device. The image displacement device which intentionally displaces the image in this way may not employ the vibration proofing lens as in this embodiment, but may displace an image pickup element of the camera to displace a image pickup range of effectively picking up the image for recording or regeneration, and displace the image intentionally, or an electronic image displacement device for displacing a range of segmenting the image signal for recording or regeneration from the range of picked up image that is picked up by the image pickup element of the camera to displace the image intentionally. In this image deflection correction of other methods, the correction amount signal (equivalent to the angle signal) for displacing the image by the image displacement device in terms of the displacement amount required to cancel the image deflection in the same way as in this embodiment by making the integration process for the angular velocity signal acquired from the angular velocity sensor 10 can be also obtained.

On the other hand, the angular velocity signal outputted from the angular velocity sensor 10 and amplified by the amplification circuit 12 is passed through a signal line where required preprocessing is performed by the preprocessing part consisting of the DC cutting part 14 and the LPF 16 as described previously and inputted as the angular velocity signal L1 into the A/D converter 18, or passed through a signal line without the preprocessing directly coupled from the amplification circuit 12 to the A/D converter 18 and inputted into the A/D converter 18. This angular velocity signal is converted into digital signal by the A/D converter 18 and inputted in parallel to the angular velocity signal L1 into the CPU 20.

Thereby, the CPU 20 acquires the angular velocity signal for pan/tilt judgment not subjected to the preprocessing, in parallel to the angular velocity signal L1 subjected to the preprocessing for calculating the correction amount (angle signal). In the following, the angular velocity signal L1 subjected to the preprocessing by the preprocessing part is referred to as the correction amount calculation signal L1, and the angular velocity signal not subjected to the preprocessing that is acquired through the signal line directly coupled from the amplification circuit 12 to the A/D converter 20 is referred to as the pan/tilt judgment signal L2.

The pan/tilt judgment is to judge whether or not the optical system (camera) is in the photographing composition change operation such as the panning operation or tilting operation by the intentional operation of changing the photographing composition by the cameraman, rather than in the vibration. Various judgment methods have been proposed. In this embodiment, the determination condition is that the magnitude (absolute value) |D−B| of the value D of the pan/tilt judgment signal L2 not subjected to the preprocessing minus the reference value B (value of the pan/tilt judgment signal L2 in the state without vibration) indicating the central value of deflection of the pan/tilt judgment signal L2 exceeds a prescribed threshold value Ds continually for a certain period of time Ts or more, as will be described in detail later. If the determination condition is satisfied, it is judged that the pan/tilt operation is active, or otherwise, it is judged that the pan/tilt operation is not active.

The CPU 20 makes the pan/tilt start judgment, based on the pan/tilt judgment signal L2, and if it is judged that the camera is in the pan/tilt operation, a process for stopping the image deflection correction is performed. For example, the correction amount calculation signal L1 is substantially cut off by making the cut-off frequency of the DC cutting part (HPF) 14 higher. On the other hand, the correction amount is gradually decreased to zero by continually calculating the correction amount (angle signal), and the vibration proofing lens 28 is driven, based on its correction amount, so that the vibration proofing lens 28 is moved to the reference position and stopped. In this way, the nonconformity caused by the image deflection correction during the pan/tilt operation is prevented by stopping the image deflection correction during the pan/tilt operation.

If the image deflection correction is stopped by judging that the pan/tilt operation is active, the image deflection correction is restarted by judging that the pan/tilt operation is ended, when the prescribed condition is satisfied. This condition is that the magnitude (absolute value) |D−B| of the value D of the pan/tilt judgment signal L2 minus the reference value B is less than a prescribed threshold value (smaller than the above-mentioned threshold Ds) continually for a certain period of time or more.

Also, if it is judged that the pan/tilt operation is active, the image deflection correction is not fully stopped, but the efficacy of the image deflection correction may be reduced.

Subsequently, the pan/tilt judgment will be detailed below. The configuration of the image deflection correction apparatus as shown in FIG. 1 is the configuration for making the image deflection correction against the vibration occurring in any one of the horizontal and vertical directions. Practically, the configurations for making the image deflection correction against the vibration occurring in both the horizontal and vertical directions are provided in parallel to the vibration proofing lens 28. Accordingly, two angular velocity sensors 10 are provided to detect the vibration in the horizontal direction and the vibration in the vertical direction. In the case where the angular velocity sensor 10 as shown in FIG. 1 is the sensor for detecting the vibration in the horizontal direction, the pan judgment as to whether or not the pan/tilt operation is active in the horizontal direction, namely, whether or not the panning operation is active, is made, based on a pan/tilt judgment signal L2 acquired from the angular velocity sensor 10. If it is judged that the panning operation is active, the image deflection correction in the horizontal direction is stopped. On the other hand, in the case where the angular velocity sensor 10 as shown in FIG. 1 is the sensor for detecting the vibration in the vertical direction, the tilt judgment as to whether or not the pan/tilt operation is active in the vertical direction, namely, whether or not the tilting operation is active, is made, based on the pan/tilt judgment signal L2 acquired from the angular velocity sensor 10. If it is judged that the tilting operation is active, the image deflection correction in the vertical direction is stopped. The CPU 20 performs a process for both the image deflection correction in the horizontal direction and the image deflection correction in the vertical directions. The correction amount calculation signal L1 and the pan/tilt judgment signal L2 obtained from the angular velocity sensor for detecting the vibration in the horizontal direction and the angular velocity sensor for detecting the vibration in the vertical direction are inputted into the CPU 20.

In the following explanation, the angular velocity sensor 10 for detecting the vibration in the horizontal direction is defined as the horizontal angular velocity sensor 10H, and the angular velocity sensor for detecting the vibration in the vertical direction is defined as the vertical angular velocity sensor 10V. Also, the pan/tilt judgment signal L2 for pan judgment acquired from the horizontal angular velocity sensor 10H is defined as the pan judgment signal L2H and the pan/tilt judgment signal L2 for tilt judgment acquired from the vertical angular velocity sensor 10V is defined as the tilt judgment signal L2V.

In the above pan judgment or tilt judgment, the judgment as to whether or not the panning operation is active, or the tilting operation is active, may be made in the following way.

Figure 2:
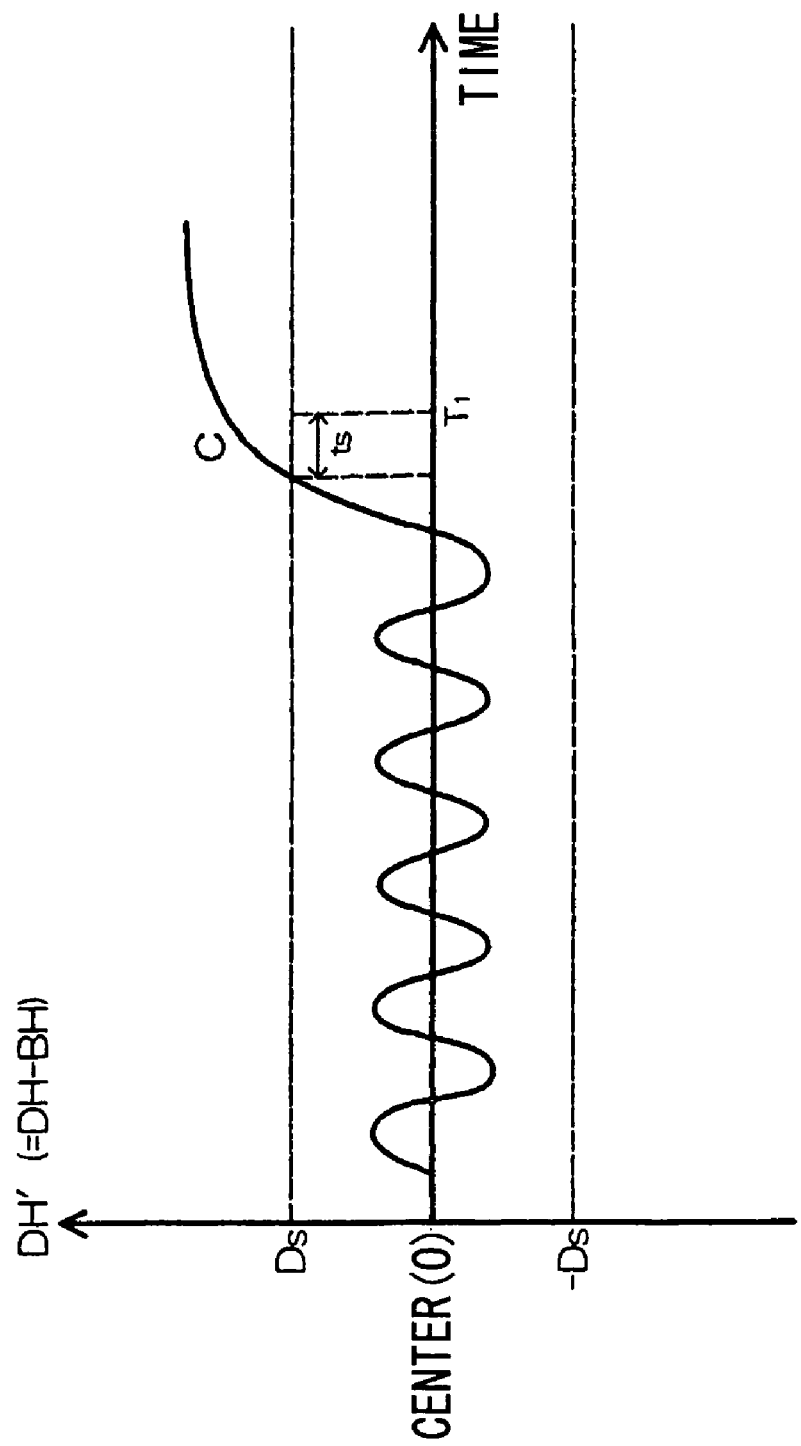
FIG. 2 is a view showing one example of the waveform of a pan judgment signal.

First of all, the pan judgment in a state where it is judged that neither the panning operation nor the tilting operation is performed in the pan judgment and the tilt judgment will be described below. FIG. 2 is a view illustrating the waveform C of the pan judgment signal L2H obtained from the horizontal angular velocity sensor 10H. The value DH of the pan judgment signal L2H does not become zero even when there is no vibration, because the DC components are cut off by the DC cutting part 14. Therefore, the CPU 20 acquires in advance a value when there is no vibration by measurement, and stores the value as the reference value (central value indicating the deflection center) BH. In FIG. 2, the longitudinal axis represents the value (DH−BH) (variation amount from the reference value BH) in which the reference value BH is subtracted from the value DH of the pan judgment signal L2H, as the value DH' of the pan judgment signal L2H, wherein the central value (value of deflection center) when there is no vibration is zero.

As shown in FIG. 2, a prescribed threshold value Ds, −Ds is set for the value DH' of the pan judgment signal L2H. The CPU 20 has the determination condition that the magnitude (absolute value) |DH−BH| of the value DH' of the pan judgment signal L2H exceeds the threshold value Ds continually for the certain period of time ts to judge that the panning operation is active. The CPU 20 makes the panning judgment as to whether or not the determination condition is satisfied. If it is detected that the determination condition is satisfied, it is judged that the panning operation is active (the panning operation is started) at the time of detection. In FIG. 2, the determination condition is satisfied at the time of T1, and it is judged that the panning operation is active at the time of T1. If it is judged that the panning operation is active, the CPU 20 performs a process for stopping the image deflection correction in the horizontal direction.

The tilt judgment is made in the same way as the pan judgment. The reference value BV is designated for the value DV of the tilt judgment signal L2V obtained from the vertical angular velocity sensor 10V. Supposing that the value (DV−BH) of the value DV of the tilt judgment signal L2V minus the reference value BV is defined as the value DV' of the tilt judgment signal L2V, the determination condition for judging that the tilting operation is active is that the magnitude (absolute value) |DV−BV| of the value DV' of the tilt judgment signal L2V exceeds the threshold value Ds continually for the certain period of time ts. If it is detected that the determination condition is satisfied, the CPU 20 judges that the tilting operation is active (the tilting operation is started) at that time, and performs a process for stopping the image deflection correction in the vertical direction.

On the other hand, if it is judged that the determination is satisfied in any one of the pan judgment and the tilt judgment, namely, the panning operation or the tilting operation is performed, the CPU 20 changes (loosens) the determination condition so that the determination condition in the other judgment may be easier to be satisfied. For example, if the determination condition for the tilt judgment is satisfied, the pan judgment is made by changing the threshold value in the determination condition for the pan judgment to the value Ds' lower than the threshold value Ds as shown in FIG. 2.

Figure 3A:
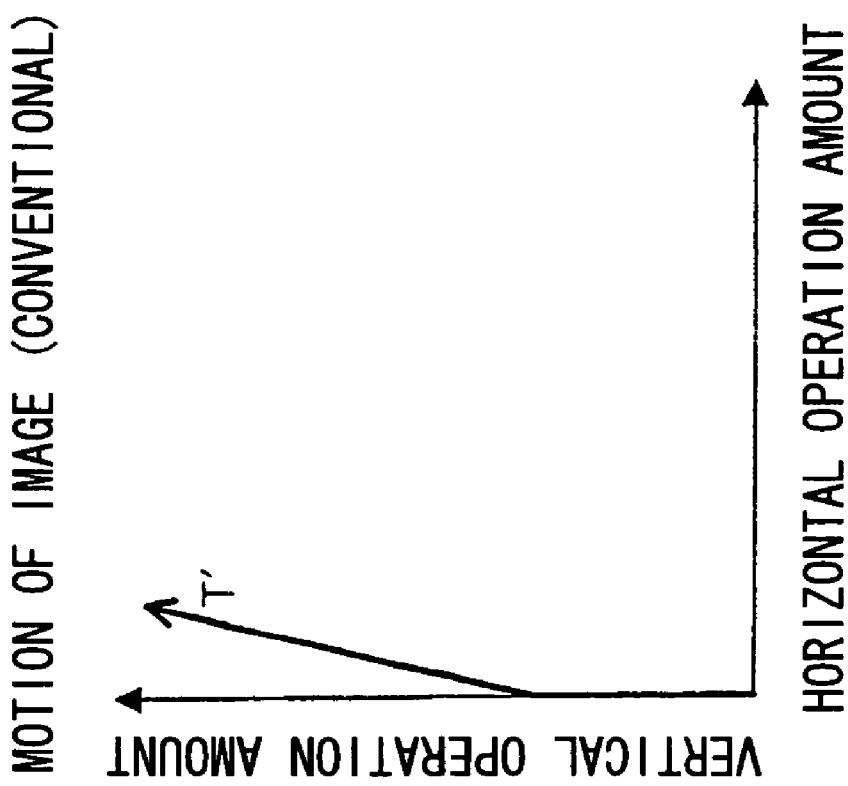
FIGS. 3A and 3B are explanatory views for explaining a pan/tilt operation in the oblique direction.
Figure 3B:
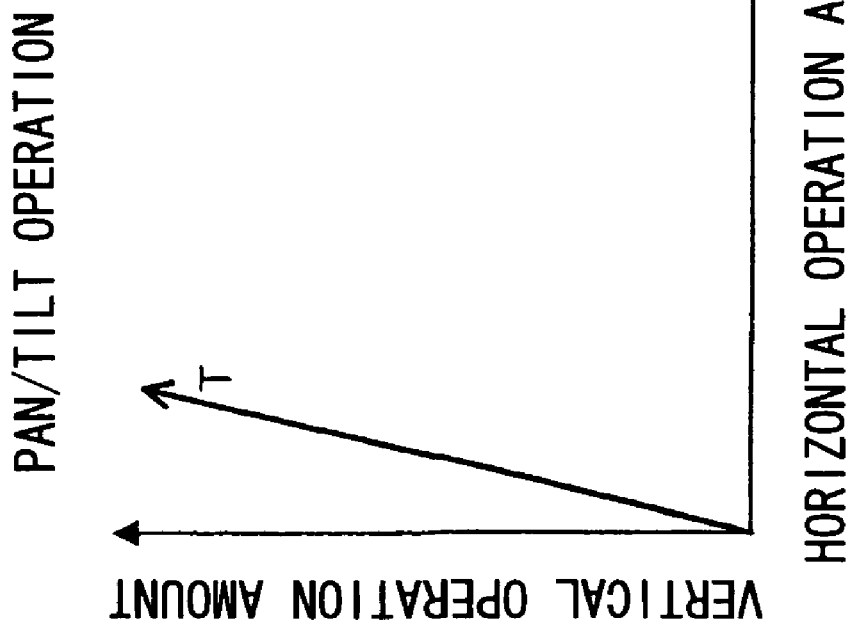
Figure 4:
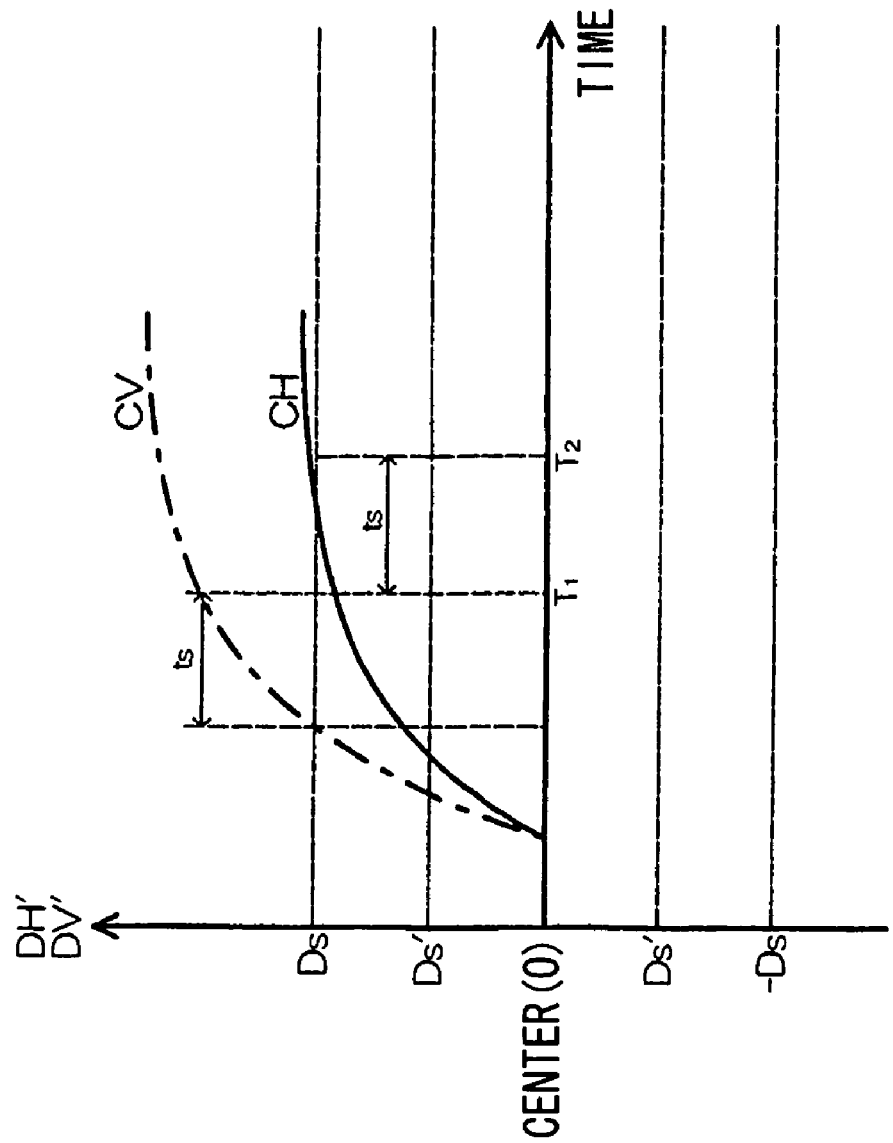
FIG. 4 is a view showing one example of the waveform of a pan judgment signal and a tilt judgment signal which are acquired by the pan/tilt operation in the oblique direction.

Herein, it is assumed that the pan/tilt operation is performed in the oblique direction between the horizontal direction and the vertical direction and closer to the vertical direction, as indicated by a locus T in FIG. 3A. FIG. 4 illustrates the waveform CH of the pan judgment signal L2H and the waveform CV of the tilt judgment signal L2V obtained in this case. As shown in FIG. 4, the waveform CH of the pan judgment signal L2H is smaller than the waveform CV of the tilt judgment signal L2V. At this time, first of all, it is detected that the tilt judgment signal L2V satisfies the determination condition for tilt judgment at the time of T1 in FIG. 4, whereby the image deflection correction in the vertical direction is stopped. On the other hand, it is assumed that the threshold value Ds in the pan judgment is not changed as conventionally. Since the pan judgment signal L2H does not exceed the threshold value Ds at the time of T1, the time when the determination condition for pan judgment is satisfied is delayed by the time from the time of T1 to the time when the magnitude of the value DH' of the pan judgment signal L2H reaches the threshold value Ds plus the determination time ts for pan judgment. In this case, the motion of image on the photographing screen is shown in FIG. 3B. When the pan/tilt operation in the oblique direction is started, the image firstly starts to move in the vertical direction where the image deflection correction is stopped, as shown in FIG. 3B. And behind it, the image starts to move in the horizontal direction from the time when the image deflection correction in the horizontal direction is stopped. Therefore, the motion of image is deviated from the locus T of the pan/tilt operation as shown in FIG. 3A, so that the photographing composition is not changed as intended by the cameraman. Especially when the magnitude of the value DH' of the pan judgment signal L2H exceeds the threshold value Ds at a later time, or does not exceed the threshold value Ds, there is a significant problem, unlike the case of FIG. 4.

On the contrary, in this embodiment, from the time of T1 when the determination condition for tilt judgment is satisfied in FIG. 4, the threshold in the pan judgment is changed to the value Ds' lower than the threshold value Ds. Thereby, the magnitude of the value DH' of the pan judgment signal L2H is easier to exceed. In the case of FIG. 4, from the time of T1 when the determination condition for tilt judgment is satisfied by changing the threshold value to Ds', the magnitude of the value DH' of the pan judgment signal L2H exceeds the threshold value Ds', and the determination condition for pan judgment is satisfied at the time of T2 when the determination time ts only passes from the time of T1. Accordingly, the time since the determination condition for tilt judgment is satisfied till the determination condition for pan judgment is satisfied is shorter than conventionally, whereby there is smaller deviation between the timing when the determination condition for tilt judgment is satisfied and the timing when the determination condition for pan judgment is satisfied. Therefore, the motion of image on the photographing screen becomes closer to the locus T of the pan/tilt operation as shown in FIG. 3A, so that a change of photographing composition as intended by the cameraman is appropriately reflected to the motion of the image on the photographing screen. There is the great effect that it is possible to judge that the panning operation is active at the time of T2 when the determination time ts passes from the time of T1 by changing the threshold value to Ds', even when the magnitude of the value DH' of the pan judgment signal L2H exceeds the threshold value Ds at a later time, or does not exceed the threshold value Ds at the time of T1 and beyond, unlike the case of FIG. 4.

The threshold value Ds' has such a magnitude that the determination condition for pan judgment is not satisfied for the vibration subjected to image deflection correction. That is, if the changed threshold value Ds' is too small, the camera performs the pan/tilt operation (tilting operation) only in the vertical direction, and even when the vibration subjected to image deflection correction only occurs in the horizontal direction, there is a risk that the image deflection correction in the horizontal direction is stopped by judging that the vibration in the horizontal direction is caused by the panning operation. Therefore, the threshold value Ds' is set to the value having the magnitude not to cause this risk and smaller than the threshold value Ds.

Though in the above explanation the determination condition for pan judgment is changed if the determination condition for tilt judgment is satisfied before the determination condition for pan judgment, the determination condition for tilt judgment is also changed if the determination condition for pan judgment is satisfied before the determination condition for tilt judgment, whereby the threshold value in the determination condition for tilt judgment is changed to the lower value Ds' than Ds.

FIG. 5 is a flowchart showing a processing procedure of the pan/tilt judgment in the CPU 20. First of all, the CPU 20 reads the value DH of the pan judgment signal L2H and the value DV of the tilt judgment signal L2V from the horizontal angular velocity sensor 10H and the vertical angular velocity sensor 10V (step S1). Then, it is judged whether or not the determination condition for pan judgment and the determination condition for tilt judgment are satisfied, based on the value DH of the pan judgment signal L2H and the value DV of the tilt judgment signal L2V that are read (step S12). That is, if the threshold value for pan judgment or tilt judgment is not changed at step S18 or step S24, it is judged whether or not each of the absolute value |DH−BH| of the value DH' (=DH−BH) of the pan judgment signal L2H in consideration of the reference value BH and the absolute value |DV−BV| of the value DV' (=DV−BV) of the tilt judgment signal L2V in consideration of the reference value BV exceeds the threshold value Ds. If the threshold value Ds is exceeded, the time for which the threshold value is exceeded continually is measured. If the threshold value for pan judgment or tilt judgment is changed at step S18 or step S24, the above process is performed, employing the threshold value Ds' instead of the threshold value Ds.

Next, the CPU 20 judges whether or not the camera is in the panning operation, by checking whether or not the pan judgment signal L2H satisfies the determination condition for pan judgment, namely, whether or not the absolute value of the value DH' of the pan judgment signal L2H exceeds the threshold value Ds continually for the determination time ts, based on the processed result at step S12 (step S14).

If it is judged that the panning operation is not active (NO) at step S14, the CPU 20 judges whether or not the camera is in the tilting operation, by checking whether or not the tilt judgment signal L2V satisfies the determination condition for tilt judgment, namely, whether or not the absolute value of the value DV' of the tilt judgment signal L2V exceeds the threshold value Ds continually for the determination time ts, based on the processed result at step S12 (step S20). If it is judged that the tilting operation is not active (NO) at step S20, the procedure returns to step S10.

On the other hand, if it is judged that the panning operation is active (YES) at step S14, the CPU 20 stops the image deflection correction in the horizontal direction (step S16). Also, the threshold value Ds in the tilt judgment is changed to the smaller value Ds', and the pan judgment is ended (step S18). And the procedure returns to step S20.

If it is judged that the tilting operation is active (YES) at step S20, the CPU 20 stops the image deflection correction in the vertical direction (step S22). Also, the threshold value Ds in the pan judgment is changed to the smaller value Ds', and the tilt judgment is ended (step S18). And the procedure goes to step S10.

If the threshold value for pan judgment or the threshold value for tilt judgment is changed at step S18 or step S24 in the above way, the process for pan judgment or tilt judgment that is not ended (where the determination condition is not satisfied) is made employing the changed threshold value.

In the above embodiment, if one of the determination conditions for pan judgment and tilt judgment is satisfied, and the threshold value for the other determination condition is changed from Ds to Ds', it is judged whether or not the determination condition with the changed threshold value Ds' is satisfied for the pan judgment signal L2H or the tile judgment signal L2V that is obtained after the time of change. On the contrary, it may be judged whether or not the determination condition with the threshold value Ds is satisfied before the time of changing the threshold value Ds to Ds'. For example, the values of the pan judgment signal L2H and the tilt judgment signal L2V are stored from the time in the past at least the determination time ts before the present time. And when the threshold value in the determination condition for pan judgment is changed to Ds' by judging that the determination condition for tilt judgment is satisfied, the time for which the absolute value of the value DH' of the pan judgment signal L2H exceeds the threshold value Ds' continually up to the present time may be acquired ex post facto by referring to the stored value of the pan judgment signal L2H in the past. If the time for which the threshold value Ds' is already exceeded continually is longer than the determination time ts when the threshold value is changed to Ds', it is judged that the determination condition for pan judgment is satisfied substantially at the same time when it is judged that the determination condition for tilt judgment is satisfied, whereby there is no deviation in the timing of stopping the image deflection correction between the horizontal direction and the vertical direction, so that a change of photographing composition in the oblique direction by the cameraman is appropriately reflected to the motion of image on the photographing screen. As another method, the time for which the absolute value of the value DH' of the pan judgment signal L2H and the absolute value of the value DV' of the tilt judgment signal L2V always exceed the threshold value Ds continually before changing the threshold value, and the time for which they always exceed the threshold value Ds' continually, may be measured. For example, if it is judged that the determination condition for tilt judgment is satisfied because the absolute value of the value DV' of the tilt judgment signal L2V exceeds the threshold value Ds continually for the determination time ts, the pan judgment can be made under the determination condition where the threshold value is changed to Ds' ex post facto, employing the measured value of the time for which the absolute value of the value DH' of the pan judgment signal L2H exceeds the threshold value Ds' continually up to the present time.

In the above embodiment, as the method for changing (loosening) the determination condition so that the determination condition for pan judgment or tilt judgment that is not satisfied ahead may be satisfied more easily, the threshold value for the determination condition is lowered, but the determination time ts for the determination condition may be shortened, instead of lowering the threshold value. Also, the threshold value for the determination condition may be lowered, and the determination time may be shortened.

Also, even when the determination condition for pan judgment or tilt judgment is different from the determination condition in the above embodiment, the determination condition can be changed (loosened) so that the determination condition for pan judgment or tilt judgment that is not satisfied ahead may be satisfied more easily, whereby there is the same effect as in the above embodiment where the determination condition is changed in the above way. An example of the different determination condition from the above embodiment is given below, regarding the determination condition for pan judgment alone (the determination condition for tilt judgment is identical to the determination condition for pan judgment). The determination condition for judging the panning operation may be that the absolute value of the value DH' of the pan judgment signal L2H exceeds the prescribed threshold value. In addition to this condition, the condition regarding the time or other conditions may be added. Moreover, the determination condition may be that not the absolute value of the value DH' of the pan judgment signal L2H, but the correction amount of correcting the image deflection (displacement amount of the vibration proofing lens 28 to correct the image deflection) by canceling the image deflection as described in the above embodiment exceeds the prescribed threshold value, or other conditions may be added to the determination condition. In this way, when the determination condition is that at least the value of predetermined signal exceeds the prescribed threshold value, the determination condition can be loosened by changing the threshold value to the lower value.

As another example of the determination condition, the determination condition for judging the panning operation may be that the value DH' of the pan judgment signal L2H, or the correction amount, becomes the positive or negative value continually for the certain determination time or more. If the determination condition includes the condition that at least the time to satisfy the prescribed condition is more than or equal to the certain determination time (threshold value of time), the determination condition can be loosened by shortening the determination time.

In the above embodiment, the vibration applied to the optical system is detected by the angular velocity sensor, the correction amount is calculated, based on an angular velocity signal outputted from the angular velocity sensor, and the pan/tilt judgment is made. However, this invention may be also applicable to the form where the vibration applied to the optical system is detected by a deflection detection device other than the angular velocity sensor, for example, an angular acceleration sensor, an acceleration sensor, a speed sensor, an angular displacement sensor, or a displacement sensor, and the correction amount is calculated or the pan/tilt judgment is made based on a deflection signal outputted from the deflection detection device corresponding to the vibration.

Though in the above embodiment, the image deflection correction is stopped or the efficacy of the image deflection correction is reduced as the mode of image deflection correction when the pan/tilt operation is active, other modes of image deflection correction when the pan/tilt operation is active may be taken. The invention may be also applicable to a case where the mode of image deflection correction when the pan/tilt operation is active and the mode of image deflection correction when the pan/tilt operation is not active are switched.

What is claimed is:
1. An image deflection correction apparatus comprising:
a horizontal deflection detection device which detects a vibration in a horizontal direction applied to an optical system and outputs a horizontal deflection signal according to the detected vibration;
a vertical deflection detection device which detects a vibration in a vertical direction applied to the optical system and outputs a vertical deflection signal according to the detected vibration;

a pan judgment device which judges whether or not a pan determination condition is satisfied to judge that the optical system is in a panning operation, based on the horizontal deflection signal outputted by the horizontal deflection detection device;

a tilt judgment device which judges whether or not a tilt determination condition is satisfied to judge that the optical system is in a tilting operation, based on the vertical deflection signal outputted by the vertical deflection detection device;

a determination condition change device which changes a second determination condition to be more easily satisfied, if any one of the pan determination condition in the pan judgment device and the tilt determination condition in the tilt judgment device is satisfied;

an image deflection correction device which corrects an image deflection to cancel the image deflection caused by the vibration in the horizontal and vertical directions applied to the optical system, based on the deflection signals outputted by the horizontal deflection detection device and the vertical deflection detection device; and a correction switch device which switches the mode of horizontal image deflection correction by the image deflection correction device to the mode where the panning operation is active, if it is judged that the pan determination condition is satisfied by the pan judgment device, or switches the mode of vertical image deflection correction by said image deflection correction device to the mode where the tilting operation is active, if it is judged that the tilt determination condition is satisfied by the tilt judgment device, wherein the pan determination condition in the pan judgment device and the tilt determination condition in the tilt judgment device are that at least a magnitude of the deflection signal or the magnitude of a correction amount required to cancel the image deflection obtained based on the deflection signal exceeds a prescribed threshold value, and the determination condition change device changes the threshold value to the lower value than where the pan determination condition and the tilt determination condition are not satisfied, if any one of the pan determination condition and the tilt determination condition is satisfied.

2. The image deflection correction apparatus according to claim 1, wherein the pan determination condition in the pan judgment device and the tilt determination condition in the tilt judgment device are that a magnitude of the deflection signal or the magnitude of the correction amount required to cancel the image deflection obtained based on the deflection signal exceeds a prescribed threshold value continually for a certain determination time or more, and the determination condition change device changes said determination time to the shorter time than where said pan determination condition and the tilt determination condition are not satisfied, if any one of the pan determination condition and the tilt determination condition is satisfied.

3. An image deflection correction apparatus comprising:

a horizontal deflection detection device which detects a vibration in a horizontal direction applied to an optical system and outputs a horizontal deflection signal according to the detected vibration;

a vertical deflection detection device which detects a vibration in a vertical direction applied to the optical system and outputs a vertical deflection signal according to the detected vibration;

a pan judgment device which judges whether or not a pan determination condition is satisfied to judge that the optical system is in panning operation, based on the horizontal deflection signal outputted by the horizontal deflection detection device;

a tilt judgment device which judges whether or not a tilt determination condition is satisfied to judge that the optical system is in a tilting operation, based on the vertical deflection signal outputted by the vertical deflection detection device;

a determination condition change device which changes a second determination condition to be more easily satisfied, if any one of the pan determination condition in the pan judgment device and the tilt determination condition in the tilt judgment device is satisfied;

an image deflection correction device which corrects an image deflection to cancel the image deflection caused by the vibration in the horizontal and vertical directions applied to the optical system, based on the deflection signals outputted by the horizontal, deflection detection device and the vertical deflection detection device; and a correction switch device which switches the mode of horizontal image deflection correction by the image deflection correction device to the mode where the panning operation is active, if it is judged that the pan determination condition is satisfied by the pan judgment device, or switches the mode of vertical image deflection correction by said image deflection correction device to the mode where the tilting operation is active, if it is judged that the tilt determination condition is satisfied by the tilt judgment device, wherein the pan determination condition in the pan judgment device and the tilt determination condition in the tilt judgment device are that a magnitude of the deflection signal or the magnitude of the correction amount required to cancel the image deflection obtained based on the deflection signal exceeds a prescribed threshold value continually for a certain determination time or more, and the determination condition change device changes said determination time to the shorter time than where said pan determination condition and the tilt determination condition are not satisfied, if any one of the pan determination condition and the tilt determination condition is satisfied.

* * * * *